United States Patent [19]

Eickmann

[11] 3,768,757
[45] Oct. 30, 1973

[54] FLUID-BORNE VEHICLE

[76] Inventor: Karl Eickmann, Hayama-machi, Kanagawa-ken, Isshiki, Japan

[22] Filed: July 12, 1972

[21] Appl. No.: 272,913

[30] Foreign Application Priority Data
July 14, 1971  Austria .................. A 6145/71

[52] U.S. Cl. ............... 244/17.23, 60/424, 60/484, 416/171
[51] Int. Cl. ............................................ B64c 27/12
[58] Field of Search ...... 244/17.11–17.27, 60, 53, 6, 7, 4; 416/171, 120; 60/484, 424

[56] References Cited
UNITED STATES PATENTS

| | | |
|---|---|---|
| 2,212,490 | 8/1940 | Adler, Jr. .......................... 244/53 R |
| 2,454,138 | 11/1948 | Delzer .............................. 244/60 X |
| 3,092,970 | 6/1963 | Sampietro ......................... 60/484 X |
| 3,253,806 | 5/1966 | Eickmann ..................... 244/53 R X |

*Primary Examiner*—Milton Buchler
*Assistant Examiner*—Paul E. Sauberer
*Attorney*—Michael S. Striker

[57] ABSTRACT

The vehicle has two or more positive-displacement fluid motors each having a rotating shaft. One of the motors is closer to the leading end and the other is closer to the trailing end of the vehicle, with the one closer to the leading end having a greater volumetric displacement capacity than the other one. A fluid-flow generator is provided for producing a flow of fluid, and conduits connecting the fluid motors and the generator in series so that fluid under pressure passes from the generator sequentially to the one fluid motor, to the other fluid motor and back to the generator.

10 Claims, 3 Drawing Figures

Patented Oct. 30, 1973  3,768,757

FLUID-BORNE VEHICLE

BACKGROUND OF THE INVENTION

The present invention relates generally to a vehicle, and more particularly to a fluid-borne vehicle. Still more particularly, the present invention relates to a fluid-borne vehicle having a hydrostatic drive.

Fluid-borne vehicles with hydrostatic drive are already known from the prior art, for instance from my prior U.S. Pat. No. 3,211,399. I have disclosed therein such a vehicle which is either air-borne or water-borne and has two hydromotors one of which is located ahead of the other as seen in the direction of normal advancement of the vehicle. These hydromotors are provided with propulsion members which they drive, and are connected with a source of fluid under pressure which drives the motors and thereby the propulsion members.

The vehicle disclosed in my aforementioned U.S. patent is highly reliable and simple in its construction as well as efficient in its operation. However, it is not capable of advancing forwardly at will and under power, being able only to rise or descend essentially vertically or to remain at a given height in the fluid which bears it. Any forward movement is purely the result of hydrostatic slip, and not of powered advancement. Evidently, this is not sufficient in many instances and therefore further improvements are highly desirable.

SUMMARY OF THE INVENTION

It is, accordingly, a general object of the present invention to provide such desirable further improvements.

More particularly, it is an object of the present invention to provide a fluid-borne vehicle which is possessed of such advancements.

Still more particularly it is an object of the present invention to provide such a fluid-borne vehicle which is capable not only of essentially vertical ascent and descent, but also of powered advancement in horizontal or substnatially horizontal direction.

Another object of the invention is to provide such a vehicle which is simple in its construction and most reliable in its operation.

A concomitant object of the invention is to provide such a vehicle which is lighter in weight than what is known from the art.

In pursuance of these objects, and of others which will become apparent hereafter, one feature of the invention resides, in a fluid-borne vehicle having a leading end and a trailing end, in a combination comprising fluid flow producing means for producing a flow of fluid, and at least two positive-displacement fluid motors each having a rotating shaft and one of which is closer to said leading end than the other. The one fluid motor has a greater volumetric displacement capacity than the other motor. A rotating propulsion member is secured to each of the shafts, and conduit means connects the fluid motors and the fluid flow producing means in series for guiding fluid under pressure from the fluid flow producing means sequentially to the one fluid motor, then the other fluid motor and back to the fluid flow producing means.

With this construction the shafts and propulsion members of the two fluid motors are rotated at differential angular speeds proportional to the displacement capacity of the motors, meaning that the shaft and propulsion member of the fluid motor closer to the trailing end of the vehicle rotates somewhat faster than the shaft and propulsion member of the motor closer to the leading end of the vehicle. As a result, the vehicle is slightly inclined downwardly in forward direction, that is from its trailing end towards its leading end, and is thus capable of powered flight in forward direction.

The relationship of the volumetric displacement capacity of the two fluid motors relative to one another, together with the propulsion members driven by the motors, determines the relationship of the lift capacity of the vehicle to its powered flight capacity, that is its flight in forward direction. It should be understood that reference to the term "flight" is made here for the sake of convenience and simplicity of description; wherever the term "flight" is used herein it should be understood that it is intended to refer not only to the movement of airborne vehicles but also to the movement of water-borne vehicles.

In order to avoid excessive downward inclination of the vehicle in forward direction, the differential between the volumetric displacement capacity of the two fluid motors must only be relatively slight, not very significant. An exception to this exists if the vehicle is an air-borne vehicle having wings (i.e. not a helicopter) in which case the differential may be quite substantial. Normally, however, and for instance if the vehicle is a helicopter, the differential must not be great.

According to a further embodiment of the invention, more than one fluid motor may be provided in the region of the leading end of the vehicle, and similarly more than one fluid motor may be provided in the region of the trailing end of the vehicle.

Finally, bypass means may be utilized which controls the supply of fluid to the fluid motor or motors in the region of the trailing end of the vehicle, in order to be able to equalize the rotational speed of both fluid motors during ascent and descent of the vehicle, to permit vertical ascent and descent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
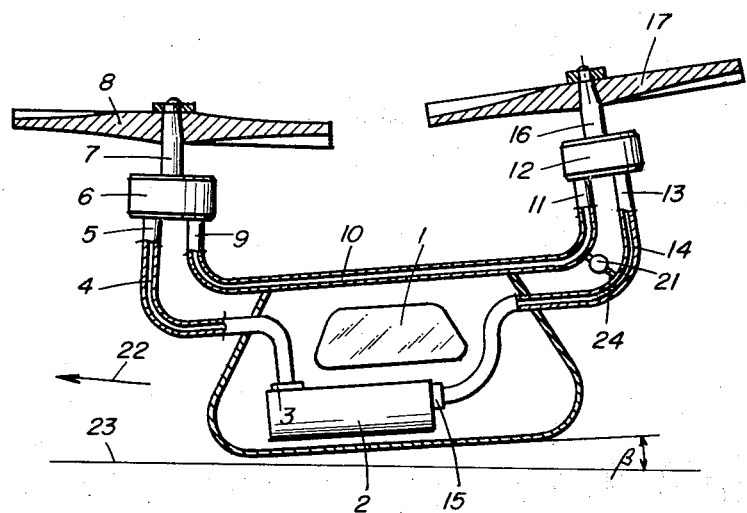
FIG. 1 is a somewhat diagrammatic longitudinal section through a vehicle according to an embodiment of the invention.
Figure 2:
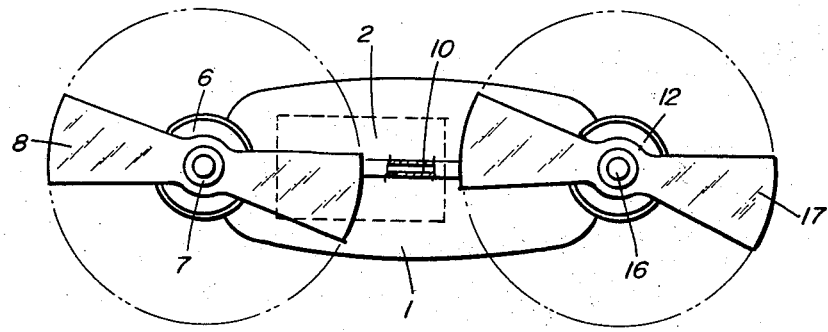
FIG. 2 is a diagrammatic-plan view of the vehicle shown in FIG. 1.

Discussing the drawing in detail, and referring firstly to the embodiment illustrated in FIGS. 1 and 2, it will be seen that reference numeral 1 designates a cabin of the vehicle, for instance a passenger cabin, a cabin capable of carrying cargo or the like. Reference numeral 2 designates a generator for generating a flow of fluid under pressure. This may either be in form of a combustion engine producing a stream of fluid under pressure, for instance of the type disclosed in U.S. Pat. No. 3,260,213 or 3,254,489, or it may be a combustion engine driving a pump, or a turbine.

An outlet 3 receives pressurized fluid and is in communication with a conduit 4 which is connected with a hydromotor 6 via an inlet 5 of the same. The hydromotor 6 is provided closer to the leading end of the vehicle than to the trailing end, that is it is the "leading" hydromotor.

An outlet 9 of the hydromotor 6 is connected with a further fluid conduit 10 which in turn communicates with the inlet 11 of a second hydromotor 12 which is the "trailing" hydromotor because it is farther away from the leading end, that is closer to the trailing end of the vehicle. Hydromotor 12 in turn has an outlet 13 which is connected with the return fluid conduit 14, the latter communicating with the inlet 15 of the fluid generator 2.

It will be appreciated that fluid generated by the generator 2 flows in a circuit defined by the conduits 4, 10 and 14 and in which the hydromotors 6 and 12 are interposed. Each of the hydromotors is provided with a shaft carrying a propulsion member, here illustrated in form of rotors or air screws 8 and 17, respectively, which are rotated as the shafts are rotated. Although the rotors 8 and 17 may in conventional manner be mounted directly on the respective shafts, they can also be mounted separately and driven by the shafts via interposed gear drives. It has been found that high speed propellers or rotors of small diameter, particularly of between substantially 2 and 3.2 meters and speeds of rotation between 1,000 and 2,500 rpm with correspondingly constant angle of inclination, can be used to advantage. The customary variation of the angle of inclination or pitch can be omitted by utilizing the present invention.

It will be understood that the structural strength of the vehicle is sufficiently assured by the presence of the various fluid conduits, but that additional supplementary reinforcing conduits may be provided if it is felt that further strengthening of the structural rigidity of the vehicle is desirable or necessary.

Tests have shown that at the aforementioned propeller sizes and rotations per minute, vibrations of the fluid conduits and the motors and propellers in horizontal direction take place only up to about 380 rpm, and in vertical direction only up to about 780 rpm. This means that in the actual operating range of between substantially 1500 to 2000 rpm (with the propeller parameters as outlined above) the vehicle is free of vibrations even if the propellers have constant pitch, for instance if they are hollow propellers or are propellers which are of pressed plastic.

The heavier components of the vehicle, particularly the cabin, the power source and the fluid generator, as well as any auxiliary components such as for instance cooling means for the fluid circuit, are arranged at a lower level than the propellers. The purpose is to provide two centers of gravity in the vehicle, namely the upper center of gravity defined by the rotating propellers and the main center of gravity resulting from the weight of the vehicle. To assure that the vehicle is stable and cannot tilt or turn over, it is necessary that the main center of gravity be located at a lower level than the center of gravity defined by the upward pull exerted by the propellers.

The power source may be a combustion engine for instance of the type mentioned in the above-identified U.S. patents, or it may be a gas turbine. High speed two-stroke engines, for instance of the type used in racing cycles or snowmobiles, can be used to produce a particularly inexpensive vehicle according to the present invention. Hydro pumps utilized here can be those of my prior U.S. Pat. Nos. 3,304,883, 3,561,328, or 3,468,262, these being particularly advantageous because they have a capacity weight of less than 200 g/hp and can operate at the high rotations of gas turbines or high-speed combustion engines by which they are driven. I can, however, also use hydromotors according to my prior art U.S. Pat. Nos. 3,158,103 or 3,417,106 because they have a capacity weight of 150 g/hp.

It is of course important to make use of the advantages of a vehicle according to the present invention, in particular the simplicity of its operation which largely assures against accidents due to operational errors. To make full use of these possibilities, the pressure in the fluid circuit has been increased as much as possible and the weight of the hydrofluid generator and motors has been reduced as much as possible, as has been the construction of the propulsion members, such as the propellers. It is now possible to use simple wood or compound propellers, and to use steel tubing for the fluid conduits instead of aluminum tubing, and the latter factor in particular not only makes the vehicle lighter but also less expensive while at the some time giving it increased strength.

It is particularly important in the vehicle according to the present invention to keep it as light in weight as possible, and therefore the quantity of pressure fluid which is carried in the vehicle should be as low as possible. Heavy cooling systems are also to be avoided.

The advantage of the present invention resides in such a manner that the "leading" hydromotor has a somewhat greater volumetric displacement capacity than the "trailing" hydromotor. The volumetric displacement capacity is defined as the amount of fluid which passes through the hydromotor during one complete revolution of the same, so that it corresponds in essence to the amount of fluid which would be advanced by the hydromotor during one complete revolution of the same if the hydromotor were operating as a pump.

It will be appreciated that with the present invention the propulsion member or propeller associated with the "leading" hydromotor will rotate slower than the propeller associated with the "trailing" hydromotor in a certain ratio, at any given speed of rotation. Thus, the desired forward movement of the vehicle is obtained and at the same time the difficulties of prior art vehicles are overcome. Furthermore, the previously existing losses in the fluid circuit are avoided and the speed and lifting capability of the vehicle increased. The advancement in forward direction is now in a given relationship with the lifting capability of the vehicle, so that expenses and complicated controls are avoided and the vehicle can advance at steady speed forwardly without requiring supervision as to its speed. Furthermore, only a single control device is required for the vehicle during propulsion of the same in an unobstructed fluid-containing space, namely the altitude control which can be accomplished by regulating the operational speed of the drive with the amount of fluid supplied by the hydrofluid generator.

In the actual practice, the volumetric displacement capacity of the leading hydromotor may be between substantially 0.5 and 15% greater than the volumetric displacement capacity of the trailing hydromotor, depending upon the desired lift to advancement ratio.

It is possible to provide bypass conduits and associate them with the hydromotors, as was previously necessary in order to obtain some measure of forward movement of the prior-art vehicles of the type here under discussion. In the vehicle according to the present invention this is not necessary to obtain forward movement, that is continuous advancement in forward direction. However, it can be advisable for certain ascending and descending operations and for control maneuvers. If sufficient space is available for starting and landing or ascending and descending, the provision of a bypass conduit is not necessary. However, if a strictly or almost strictly vertical ascent or descent is required, then the provision of such a bypass conduit with associated throttling means will be helpful, in order to bypass the trailing hydromotor. FIGS. 1 and 2 show such an arrangement where the bypass conduit is designated with reference numeral 4 and connects the conduits 10 and 14 with one another, the connection with the conduit 10 being effected upstream of the trailing hydromotor 12. Inserted into the bypass conduit 24 is a throttling device 21 by means of which the flow through the bypass conduit 24 can be throttled or completely precluded.

The arrow 22 in FIG. 1 indicates the normal forward direction of movement of the vehicle and the angle $\beta$ between the horizontal plane 23 and the longitudinal axis of the vehicle indicates the normal forward and downward inclination at which the vehicle will be maintained during forward movement, as a result of the differential volumetric displacement capacity of the hydromotors 6 and 12.

Figure 3:
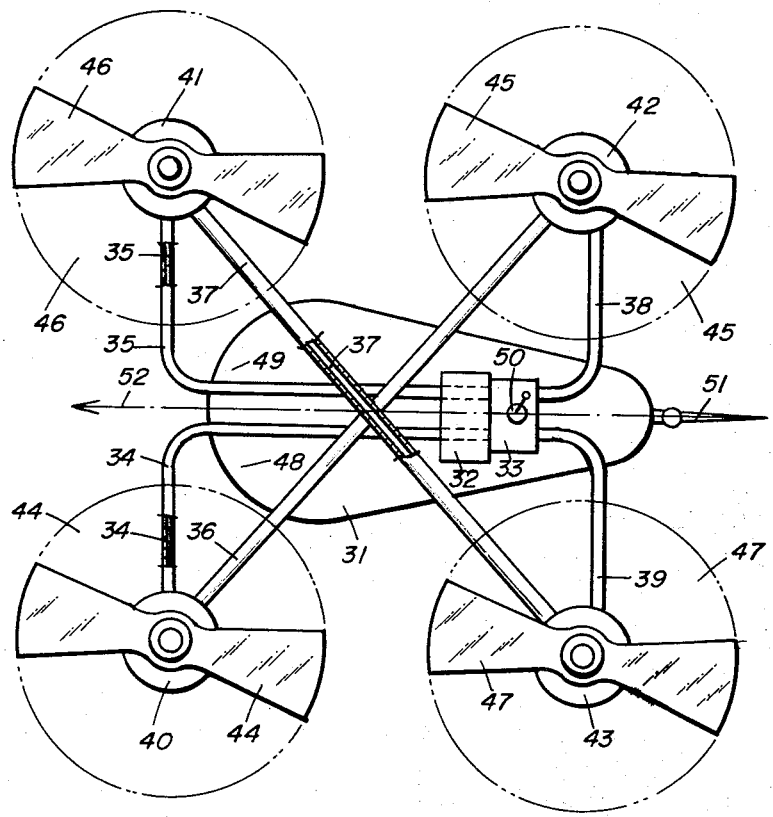
FIG. 3 is a view similar to FIG. 2 but illustrating a vehicle according to a further embodiment of the invention.

Coming to the embodiment in FIG. 3 it will be seen that this is essentially similar to the one in FIGS. 1 and 2, except that it utilizes a larger number of hydromotors, Here, the vehicle body is identified with reference numeral 1, being provided with the spaces or cabins 48 and 49 which may be cargo spaces, passenger cabins or the like.

In the vehicle body 31 there is further the power source 32 as well as the double fluid generator 33 with a flow regulating device 50 which may or may not be provided, as desired. The device 33 or generator 33 supplies two streams of fluid under pressure from appropriate separate chambers, and introduces these streams into the pressure fluid conduits 34 and 35, respectively. The two fluid streams are separated from one another during the entire movement of the streams in their respective circuits, so that there are no connections between them and there is nothing that can influence or change the ratio or volumetric identity of the streams.

One fluid circuit utilizes the conduit 34 which guides the pressure fluid of one circuit to the hydromotor 40 which drives the propeller 44 arranged at the front or forward left-hand side of the vehicle. From the motor 40 the fluid flows through the conduit 36 to the trailing hydromotor 42 which drives the propeller 45 located at the trailing or rear right-hand end of the side of the vehicle body. From there, the fluid flows through the conduit 38 back to the generator 33.

The second fluid circuit utilizes the conduit 35 to guide its pressure fluid to the leading hydromotor 51 which drives the propeller 46 located at the forward righthand side of the vehicle body, from where the fluid passes via the conduit 37 to the associated trailing hydromotor 43 which drives the propeller 47 located at the trailing lefthand side of the vehicle body. From there, the fluid returns via the conduit 39 to the generator 33.

In accordance with the present invention the two leading hydromotors 40 and 41 are so constructed that their volumetric displacement capacity is slightly larger than that of the respectively associated trailing hydromotors 42 and 43. As pointed out earlier, the relationship of the volumetric displacement capacity of the hydromotors 40 and 41 with respect to their respectively associated hydromotors 42 and 43 determines the ratio of the lift to forward movement of the vehicle.

It is advantageous but not necessary that the two pressure fluid circuits provided in this embodiment be identical in their volumetric throughput per unit of time, that the displacement capacity of the hydromotors 40 and 41 be identical, and that the same be true of the motors 42 and 43. Furthermore, the propulsion members should be arranged symmetrically with respect to the longitudinal axis of the vehicle. The leading propulsion member should be of identical size and have identical but oppositely directed pitch angles, and the same should be true of the trailing propulsion members.

The arrow 52 indicates the normal direction of forward movement of the vehicle, and a rudder 51 can be provided for guidance purposes.

The embodiment in FIG. 3 has the advantage of very great stability when the vehicle is suspended in a fluid and furthermore is highly economical in operation, has substantial speed of forward movement and substantial lifting capability. In addition, the vehicle in the embodiment of FIG. 3 is capable of making rapid ascents and descents because, as tests as well as my calculations have shown, each of the propellers helps to draw fluid into the respectively associated other propeller, so that the lift and forward advancement capability of the propellers which thus operate in tandem is substantially increased over the similar capabilities which they would have if they were to operate individually. Evidently, this reduces lift-off time, increases the lifting capability and advances the forward speed. Of course, the propellers must be close enough to one another for this purpose.

The vehicle body and the components 32 and 33 are located in this embodiment at the region of lowest flow resistance with respect to the flow of fluid to the propellers. The rotation of the propellers is controlled by the speed of the drive and/or the output of the generator.

The particularly advantageous arrangement in FIG. 3, assuring the desired identity or ratio of fluid flow in the two fluid flow circuits, can be achieved by connecting the conduit 34 of FIG. 3 with the connection 57 or 58 in FIG. 1 of U.S. Pat. No. 3,561,328, and the conduit 35 of FIG. 3 with the connection 657 or 659 of FIG. 1 of the same U.S. patent. The conduits 34 and 35 can also be connected with the connections 657 or 659 on the one hand and with the connections 57 or 58 on the other hand, of the aforementioned U.S. patent.

The generator 33 may be of the type shown in FIG. 1 of U.S. Pat. No. 3,561,328 and will assure the desired identity of the flow in quantities in both circuits, and thereby the stability of the vehicle in movement.

The somewhat larger volumetric displacement capacity of the single or several leading hydromotors can be achieved either by simply constructing the hydromotor with somewhat larger volumetric displacement capacity, or by making either the leading or the trailing hydromotor with a variable volumetric displacement capacity. In the latter instance the relationship of forward speed to lift capability of the vehicle can be continuously varied as desired, so that the speed of advancement can be appropriately influenced.

It is of course possible to provide more than the single fluid circuit shown in FIG. 2 or the two fluid circuits in FIG. 3. This is well within the concept and intent of the present invention just as it is possible to vary the particular locations of the various components from what has been shown in the drawing, as long as the guiding concepts according to the present invention are taken into consideration.

It will be understood that each of the elements described above, or two or more together, may also find a useful application in other types of constructions differing from the types described above.

While the invention has been illustrated and described as embodied in the fluid-borne vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a fluid-borne vehicle having a leading end and a trailing end, a combination comprising fluid flow producing means for producing a flow of fluid; at least two positive-displacement fluid motors each having a rotating shaft and one of which is closer to said leading end than the other, said one fluid motor having a greater volumetric displacement capacity than said other motor; a rotating propulsion member secured to each of said shafts; and conduit means connecting said fluid motors and said fluid flow producing means in series for guiding fluid under pressure from said fluid flow producing means sequentially to said one fluid motor, said other fluid motor and back to said fluid flow producing means, whereby to rotate said shafts and propulsion members at differential angular speeds proportional to the displacement capacity of said motors.

2. A combination as defined in claim 1, said propulsion members being airscrews and said shafts having upright orientations, so that said vehicle operates as a helicopter.

3. A combination as defined in claim 1, said conduit means including a bypass conduit upstream of said other fluid motor, and adjustable throttling means in said bypass conduit for throttling the flow of fluid therethrough.

4. A combination as defined in claim 3, said bypass conduit having an effective cross-section which is smaller than that of the remainder of said conduit means.

5. A combination as defined in claim 1; further comprising at least an additional one and at least an additional other fluid motor similar to said one and said other fluid motor, respectively; wherein said conduit means connects the respective one fluid motor and the respective other fluid motors in parallel; and further comprising additional rotating propulsion members associated with said additional one and said additional other fluid motor, respectively.

6. A combination as defined in claim 1; and further comprising at least one cabin.

7. A combination as defined in claim 1, said fluid flow producing means comprising generating means for generating a flow of pressure fluid in said conduit means.

8. A combination as defined in claim 1, said leading end and said trailing end each having a first lateral side and a second lateral side; further comprising an additional one and an additional other fluid motor, said one fluid motors being mounted at said first and said second lateral side of said leading end, and said other fluid motors being mounted at said first and said second lateral side of said trailing end; and wherein said conduit means comprises first conduit sections connecting said one fluid motor at said first lateral side of said leading end with said other fluid motor at said second lateral side of said trailing end and connecting both with said fluid flow producing means, and second conduit sections connecting said one fluid motor at said second lateral side of said leading end with said other fluid motor at said one lateral side of said trailing end and connecting both with said fluid flow producing means.

9. A combination as defined in claim 1, said leading end having leading first and second lateral sides, and said trailing end having trailing first and second lateral sides; further comprising an additional one and an additional other fluid motor, said one fluid motors being located at said leading first and second sides, respectively, and said other fluid motors being located at said trailing first and second sides, respectively; and wherein said conduit means defines a first fluid circuit from said fluid flow producing means to said one fluid motor at said leading first lateral side, from there to said other fluid motor at said trailing second lateral side, and from there back to said fluid flow producing means, and a second fluid circuit from said fluid flow producing means to said one fluid motor at said leading second lateral side, from there to said other fluid motor at said trailing first lateral side, and from there back to said fluid flow producing means.

10. A combination as defined in claim 9, wherein said fluid flow producing means is operative for producing in both of said fluid circuits fluid streams of identical volume.

* * * * *